United States Patent
Nakano et al.

(10) Patent No.: US 11,850,780 B2
(45) Date of Patent: Dec. 26, 2023

(54) RESIN MEMBER, MOLD FOR MOLDING RESIN MEMBER, AND METHOD FOR MANUFACTURING RESIN MEMBER

(71) Applicant: MAZDA MOTOR CORPORATION, Hiroshima (JP)

(72) Inventors: Sakura Nakano, Hiroshima (JP); Masaaki Akamine, Hiroshima (JP); Kaname Sawai, Hiroshima (JP); Akihiro Hosono, Hiroshima (JP); Shuhei Narita, Hiroshima (JP); Yu Tanaka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 307 days.

(21) Appl. No.: 17/295,980

(22) PCT Filed: Nov. 15, 2019

(86) PCT No.: PCT/JP2019/044955
§ 371 (c)(1),
(2) Date: May 21, 2021

(87) PCT Pub. No.: WO2020/105563
PCT Pub. Date: May 28, 2020

(65) Prior Publication Data
US 2022/0024095 A1  Jan. 27, 2022

(30) Foreign Application Priority Data
Nov. 22, 2018 (JP) .................. 2018-219766

(51) Int. Cl.
*B29C 45/37* (2006.01)
*B60R 13/02* (2006.01)
*B29L 11/00* (2006.01)
*B29L 31/30* (2006.01)

(52) U.S. Cl.
CPC ............ *B29C 45/372* (2013.01); *B60R 13/02* (2013.01); *B29L 2011/00* (2013.01); *B29L 2031/3005* (2013.01)

(58) Field of Classification Search
CPC ... B29C 45/372; B60R 13/02; B29L 2011/00; B29L 2031/3005
See application file for complete search history.

(56) References Cited

FOREIGN PATENT DOCUMENTS

JP  2013139091 A  7/2013

*Primary Examiner* — Mathieu D Vargot
(74) *Attorney, Agent, or Firm* — Studebaker & Brackett PC

(57) ABSTRACT

A resin member includes: a resin substrate; and a micro-embossed pattern and having a plurality of recesses and a plurality of protrusions. The plurality of protrusions includes: a plurality of first protrusions; and a plurality of second protrusions having a height of from ¼ to ¾ of the height of the first protrusions. A distance between peaks of two adjacent ones of the plurality of protrusions ranges from 100 μm to 500 μm. The number of the minute regions having an angle of inclination of from −10° to 10° with respect to the reference plane ranges from 78% to 95% of the number of all of the minute regions included in the micro-embossed pattern corresponding to the predetermined distance, and the number of the minute regions having an angle of inclination of from −1° to 1° ranges from 25% to 40% of the number of all of the minute regions.

20 Claims, 18 Drawing Sheets

RESIN MEMBER, MOLD FOR MOLDING RESIN MEMBER, AND METHOD FOR MANUFACTURING RESIN MEMBER

TECHNICAL FIELD

The present disclosure relates to a resin member, a mold for molding a resin member, and a method for manufacturing a resin member.

BACKGROUND ART

A micro-embossed pattern formed on the surface of a resin member has improved the design quality of the appearance of the resin member (see, for example, Patent Document 1).

Patent Document 1 discloses a resin member having an effectively reduced gloss value in a portion where low gloss is required. This resin member has a low-gloss portion including a large number of microprotrusions arranged at a pitch of from 50% to 100% of the root diameter of the microprotrusions.

CITATION LIST

Patent Document

Patent Document 1: Japanese Unexamined Patent Publication No. 2013-139091

SUMMARY OF THE INVENTION

Technical Problem

An excessive increase in the height of, or the pitch between each adjacent pair of, protrusions of a micro-embossed pattern formed on the surface of a resin member may enlarge a side surface connecting the protrusion and the recess. This may increase the amount of light reflected off the side surface and reduce the difference in brightness between high-brightness highlights and low-brightness shades of light reflected off the micro-embossed pattern. The surface therefore has poor gloss and poor shadows, which results in the degraded design quality of the appearance of the resin member.

It is therefore an object of the present disclosure to provide a resin member which has a surface with adequate gloss and adequate shadows and an appearance with superior design quality, a mold for molding the resin member, and a method for manufacturing the resin member.

Summary of the Invention

To solve the foregoing problems, a resin member according to an aspect of the present disclosure includes: a resin substrate; and a micro-embossed pattern formed on a surface of the resin substrate and having a plurality of recesses and a plurality of protrusions, wherein a plane passing through three optional lowest points that are deepest points included in the micro-embossed pattern per unit area is used as a reference plane, and a shortest distance from the reference plane to an optional point on the micro-embossed pattern is regarded as a height of the micro-embossed pattern, the plurality of protrusions includes: a plurality of first protrusions having a height of from 15 µm to 35 µm; and a plurality of second protrusions having a height of from ¼ to ¾ of the height of the first protrusions, a distance between peaks of two adjacent ones of the plurality of protrusions ranges from 100 µm to 500 µm, if the micro-embossed pattern corresponding to a predetermined distance in a cross section perpendicular to the reference plane is divided into minute regions each having a predetermined length in the cross section, the number of the minute regions having an angle of inclination of from −10° to 10° with respect to the reference plane ranges from 78% to 95% of the number of all of the minute regions included in the micro-embossed pattern corresponding to the predetermined distance, and the number of the minute regions having an angle of inclination of from −1° to 1° ranges from 25% to 40% of the number of all of the minute regions.

Light incident on the micro-embossed pattern at an angle of incidence of 45°, if it is incident on flat portions, increases specular reflection in which light is incident at the angle of 45° and reflected at the angle of 45°. As a result, the reflected light has more highlights. In contrast, if light is incident on an inclined surface at a transition portion from a recess to an adjacent protrusion of the micro-embossed pattern, the light is less likely to be specularly reflected and is less likely to contribute to the highlights. Here, a greater maximum difference in elevation (i.e., the height) of the micro-embossed pattern between the recesses and the protrusions and a greater distance between the peaks of two adjacent ones of the protrusions result in an increase in the proportion of the inclined surfaces formed between the peaks of the protrusions and the adjacent recesses. This may increase the amount of light reflected off the inclined surface, reduce highlights of the light reflected off the micro-embossed pattern, and reduce the gloss. The contrast between the highlights and shades may therefore be reduced, which may lead to a reduction in shadows.

According to the present disclosure, the protrusions of the micro-embossed pattern include the first protrusions, and the second protrusions lower in height than the first protrusions. Setting the pitch between two adjacent ones of the protrusions to be in the range described above can reduce the proportion of the inclined surfaces. This increases the proportion of the highlights in the reflected light, increases the gloss of the surface with the micro-embossed pattern, and increases the contrast between the highlights and the shades. As a result, clearer shadows can appear. It is therefore possible to improve the design quality of the appearance of the resin member.

In one preferred embodiment, in the cross section perpendicular to the reference plane, the micro-embossed pattern has one flat portion within a length of from 300 µm to 500 µm in a direction parallel to the reference plane, the flat portion having a length of 90 µm or more in the direction parallel to the reference plane.

Suppose that the visual spatial resolution at a distance of 30 cm from the retina of a human eye is about 90 µm. In that case, light incident on the flat portions having a length of 90 µm or more, for example, may be specularly reflected. Thus, the reflected light can be clearly perceived by humans. According to the present disclosure, the flat portions provided at the above rate exhibit highly glossy portions to visual perception of humans at a certain rate. This can increase the graininess of the micro-embossed pattern, and can improve the design quality of the appearance of the resin member.

In one preferred embodiment, a set wavelength of a lowpass filter that removes components having shorter wavelengths than the set wavelength is a cut-off wavelength $\lambda s$, a set wavelength of a highpass filter that removes components having higher wavelengths than the set wavelength is a cut-off wavelength λc, and an arithmetic average roughness Ra of the surface with the micro-embossed pattern at the cut-off wavelength λs of 2.5 μm and the cut-off wavelength λc of 80 μm ranges from 0.2 μm to 0.4 μm.

Finer asperities than the recesses and the protrusions may be formed on the surface of the micro-embossed pattern. According to the present disclosure, setting the surface roughness of the finer asperities in the surface of the micro-embossed pattern to be in the range described above can increase the intensity of the reflected light contributing to the highlights. This can provide a resin member having higher gloss and higher graininess.

In one preferred embodiment, a value of lightness of light incident at an angle of incidence of 45° and measured by a goniophotometer at a light receiving angle γ is represented as $L^*$, a lightness $L^*_{45°}$ at the light receiving angle γ of 45° ranges from 85 to 130, and a difference $L^*_{45°}-L^*_{20°}$ between the lightness $L^*_{45°}$ and a lightness $L^*_{20°}$ at the light receiving angle γ of 20° ranges from 48 to 104.

According to the present disclosure, a resin member having superior gloss, superior shadows, and an appearance with superior design quality can be provided.

In one preferred embodiment, a value of lightness of light incident at an angle of incidence of 45° and measured by a goniophotometer at a light receiving angle γ is represented as $L^*$, and a lightness $L^*_{-80°}$ at the light receiving angle γ of −80° from a portion of the resin substrate where the micro-embossed pattern is not formed is less than 6.

The present disclosure ensures enough darkness of shades and enhances the contrast between the highlights and the shades, and allows the resin member to have an appearance with superior design quality.

A forming mold according to an aspect of the present disclosure is a forming mold for manufacturing the foregoing resin member.

According to the present disclosure, a resin member having an appearance with superior design quality can be provided.

A method for manufacturing a resin member according to an aspect of the present disclosure includes: manufacturing the resin member by injection molding using the foregoing forming mold.

According to the present disclosure, a resin member having an appearance with superior design quality can be provided.

Advantages of the Invention

As described above, according to the present disclosure, the protrusions of the micro-embossed pattern include the first protrusions, and the second protrusions lower in height than the first protrusions. Setting the pitch between two adjacent ones of the protrusions to be in the range described above can reduce the proportion of the inclined surfaces of the micro-embossed pattern. This increases the proportion of the highlights in the reflected light, increases the gloss of the surface with the micro-embossed pattern, and increases the contrast between the highlights and the shades. As a result, clearer shadows can appear. This can improve the design quality of the appearance of the resin member.

DESCRIPTION OF EMBODIMENTS

Embodiments of the present disclosure will be described below with reference to the drawings. The following description of preferred embodiments is merely an example in nature, and is not intended to limit the scope, applications or use of the present disclosure.

First Embodiment

<Resin Member>

Figure 1:
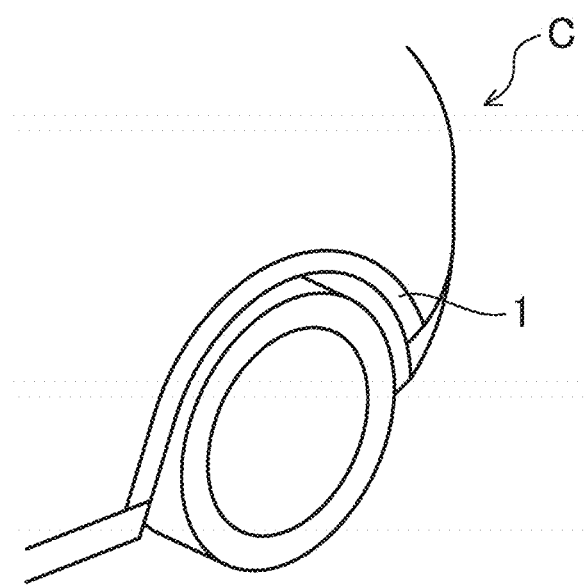
FIG. 1 illustrates a resin member according to an embodiment.

FIG. 1 illustrates an example of a resin member 1 according to this embodiment. The resin member 1 is, for example, a fender of a motor vehicle C. The resin member 1 is not limited to a fender of a motor vehicle, and is suitable for vehicle parts, such as those for motor vehicles and motorcycles, aircraft parts, electric and electronic equipment components, and the like. Examples of the vehicle parts include an engine cover, a hood, a roof, doors, a front panel, side panels, a rear panel, a front body, a lift gate, various members, various frames, bumpers, an under cover, an instrument panel, seat frames, door trims, pillar trims, and so on. Examples of the aircraft parts include landing gear pods, winglets, spoilers, edges, rudders, an elevator, a fairing, ribs, and so on. Examples of the electric and electronic equipment components include housings or the like for a personal computer, a mobile phone, a tablet, an audio system, an air conditioner, and a light fixture.

Figure 2:
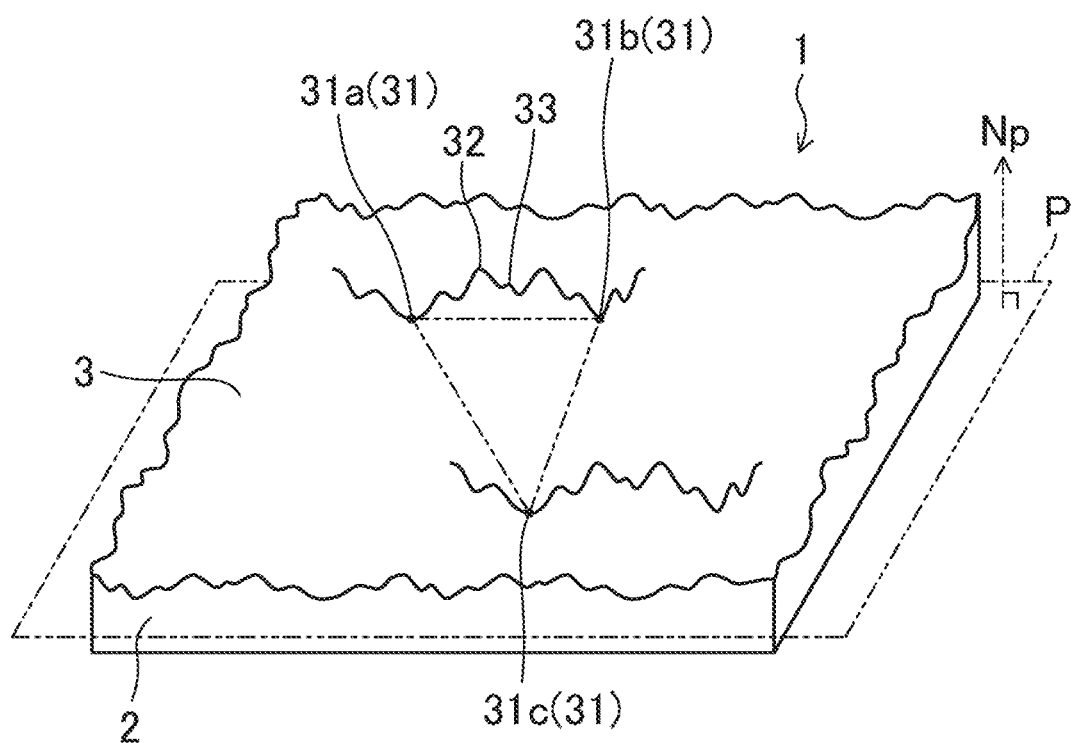
FIG. 2 is a schematic perspective view of a cross section of a portion near the surface of the resin member of FIG. 1 on an enlarged scale.

FIG. 2 is a schematic view illustrating a portion of the surface of the fender of FIG. 1 on an enlarged scale. As illustrated in FIG. 2, the resin member 1 according to this embodiment includes a resin substrate 2 and a micro-embossed pattern 3 formed in the surface of the resin substrate 2.

«Resin Substrate»

The resin substrate 2 forms the framework of the resin member 1.

Examples of a resin material for the resin substrate 2 include, but not specifically limited to, a thermoplastic resin material, a thermosetting resin material, and a mixture of these materials, which will be exemplified below.

Specific examples of the thermoplastic resin material include, for example, polypropylene resin, polyethylene resin, polycarbonate resin, polyamide resin, polyester resin, polyarylene sulfide resin, polyphenylene sulfide resin, polyetherketone resin, polyetheretherketone resin, polyetherketoneketone resin, polyether sulfone resin, polyimide resin, polyamide-imide resin, polyether-imide resin, and polysulfone resin.

Specific examples of the thermosetting resin material include, for example, epoxy resin, vinyl ester resin, phenol resin, polyimide resin, polyurethane resin, urea resin, melamine resin, bismaleimide resin, unsaturated polyester resin, and urethane acrylate resin.

Any one of these thermoplastic resin materials and/or the thermosetting resin materials may be used alone. A copolymer of one kind of the resin materials and another kind of the resin materials, a modified product thereof, a blend of two or more kinds of the resin materials, or the like may also be used. In using, as the resin material, a mixture of a thermoplastic resin material and a thermosetting resin material, the mixing ratio of these resin materials may be appropriately determined in accordance with the kinds and moldability of the resin materials, the intended strength of the resin member 1, and other elements.

To color the resin member 1, a coloring agent, such as a pigment, a dye, and a coloring masterbatch, may be added to the resin material. To improve the moldability, strength, design quality, functionality, and other features of the resin member 1, the resin material may further contain reinforced fibers, such as carbon fibers, glass fibers, and basalt fibers, a filler, such as talc, and an additive, such as an impact modifier, a UV absorbent, and a functional masterbatch. Any one of such coloring agents and/or additives may be added alone, or may be added in combination of two or more kinds thereof.

In the case of the resin member 1 containing the coloring agent, the content of the coloring agent can range, for example, from 0.5 parts by mass to 10 parts by mass with respect to 100 parts by mass of the resin material that is a mixture of a thermosetting resin material and a thermoplastic resin material, in order to achieve superior design quality and ensure sufficient moldability and sufficient strength.

In the case of the resin member 1 containing the additive or any other substances, the content of the additive can range, for example, from 40% by volume to 70% by volume if the additive is reinforced fibers, and the content of the additive can be, for example, less than or equal to 5% by mass if the additive is a substance except reinforced fibers, in order to improve the moldability, strength, design quality, functionality, and other features.

—Optical Properties of Resin Substrate—

The lightness $L^*_{-80°}$ of light reflected off the resin substrate 2 having a surface without the micro-embossed pattern 3, the lightness being obtainable through a measurement test for optical properties which will be described below, can be preferably less than 6 and more preferably less than 4. This ensures enough darkness of shades and enhances the contrast between highlights and the shades, and allows the resin member 1 to have an appearance with superior design quality.

«Micro-Embossed Pattern»

Here, the resin member 1 according to this embodiment is characterized by its surface with the micro-embossed pattern 3. A lower part of FIG. 3 illustrates an example of an optional cross section K of the resin member 1 perpendicular to a reference plane P described below.

Figure 3:
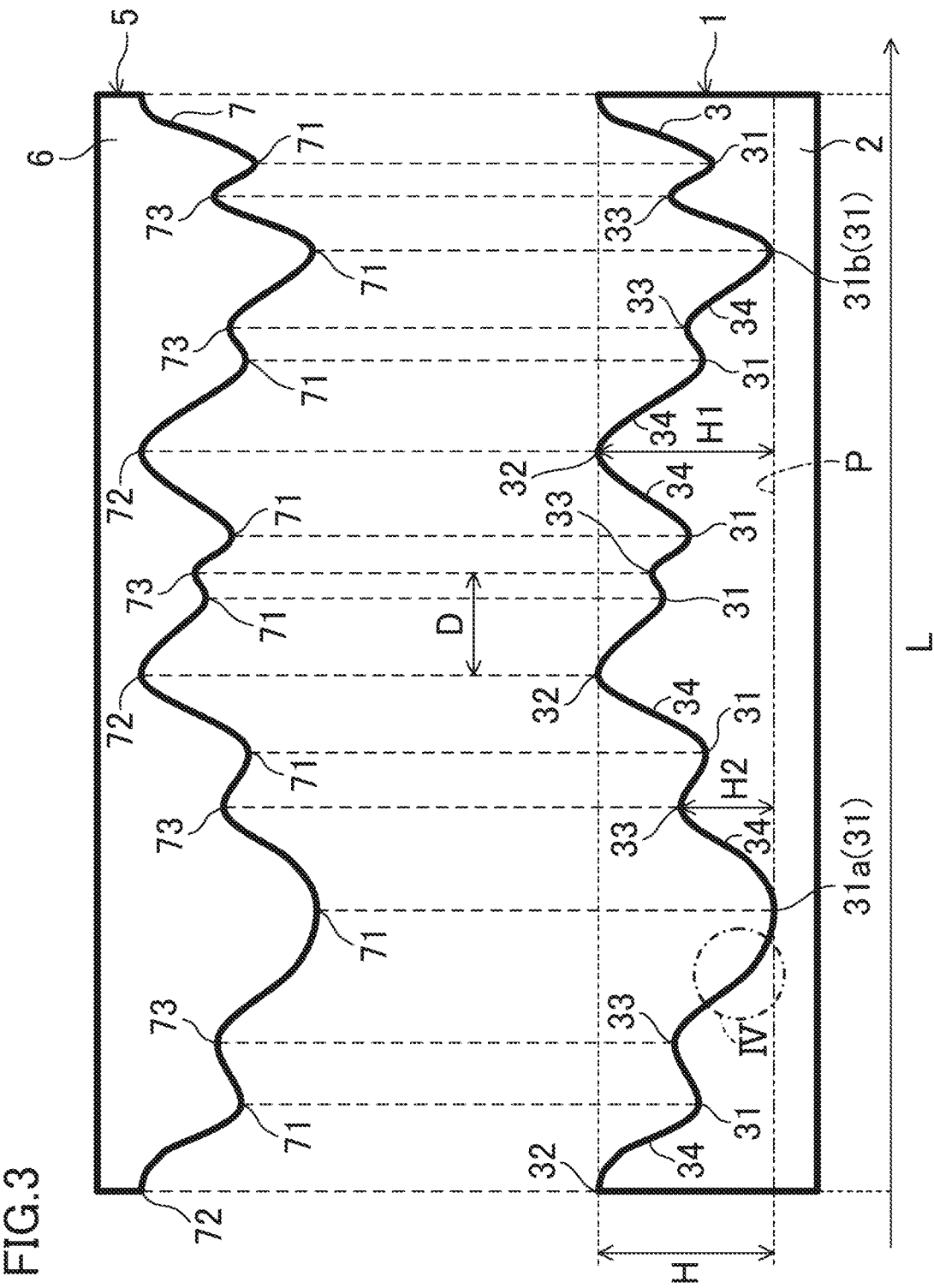
FIG. 3 includes a lower part that schematically illustrates a portion of a cross section of the resin member shown in FIG. 2 perpendicular to a reference plane P, and an upper part that is a cross-sectional view schematically illustrating a molding surface of a forming mold for molding the resin member.

The micro-embossed pattern 3 formed on the surface of the resin substrate 2 is for improving the design quality of the resin member 1, and has a plurality of recesses 31, a plurality of protrusions 32, 33, and a plurality of inclined portions 34 configured as transition portions from the recesses 31 to the adjacent protrusions 32, 33 as illustrated in FIGS. 2 and 3.

The protrusions 32, 33 include a plurality of first protrusions 32 and a plurality of second protrusions 33 as illustrated in the lower part of FIG. 3. In this specification, the first protrusions 32 and the second protrusions 33 may be collectively referred to as the "protrusions 32, 33."

—Height and Distance of Micro-Embossed Pattern—

In this specification, the character H represents the "height of the micro-embossed pattern," which denotes the shortest distance of an optional point Q on the micro-embossed pattern 3 from the reference plane P, i.e., the straight-line distance of the point Q from the reference plane P along the normal vector Np of the reference plane P. The reference plane P, as illustrated in, for example, FIGS. 2 and 3, is a plane passing through three lowest points 31a, 31b, and 31c among lowest points that are deepest points included in the micro-embossed pattern 3 per unit area, and each of the three lowest points 31a, 31b, and 31c is not located on the straight line passing through the other two points. The "difference in elevation of the micro-embossed pattern" means the difference in height H between two optional points on the micro-embossed pattern 3.

In this specification, as illustrated in, for example, FIG. 3, the character L represents the "distance of the micro-embossed pattern," which denotes the length between optional two points on the micro-embossed pattern 3 in a direction parallel to the reference plane P. Particularly in a surface shape profile of the micro-embossed pattern 3 obtained through a surface shape observation test, which will be described below, the "distance of the micro-embossed pattern" may denote the length from the start point of the measurement to a predetermined position on the micro-embossed pattern 3 in the direction parallel to the reference plane P.

The height H1 of each of the first protrusions 32 corresponds to a maximum difference in elevation of the micro-embossed pattern 3, and ranges from 15 μm to 35 μm, preferably from 15 μm to 30 μm. The height H2 of each of the second protrusions 33 ranges from ¼ to ¾ of the height H1 of the first protrusion 32, preferably from ⅓ to ⅔ thereof.

As illustrated in the lower part of FIG. 3, the distance between the peaks of two adjacent ones 32 and 33 of the protrusions 32, 33 along the length (hereinafter may sometimes be referred to as the "pitch D") ranges from 100 μm to 500 μm.

—Angle of Inclination of Minute Region—

Figure 4:
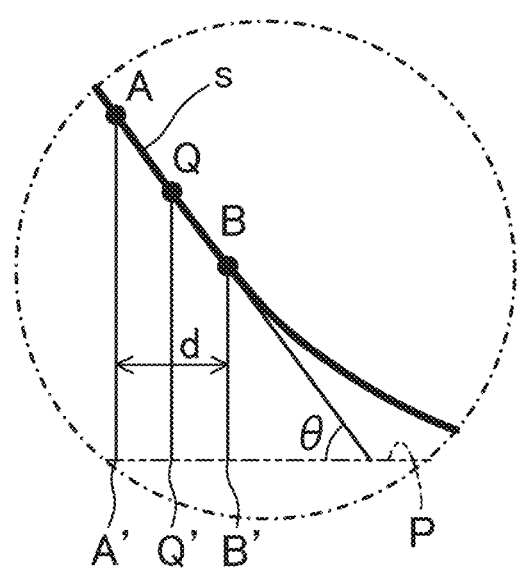
FIG. 4 is an enlarged view of an area indicated by the circle IV in FIG. 3.

FIG. 4 is a schematic view of an area indicated by the circle IV in FIG. 3 on an enlarged scale.

In this specification, "minute regions s of the micro-embossed pattern" and the "angle θ of inclination of each minute region" are defined as follows. Specifically, as illustrated in FIGS. 3 and 4, in the optional cross section K perpendicular to the reference plane P of the micro-embossed pattern 3, a projected point Q' is a point, projected on the reference plane P, of an optional point Q of the micro-embossed pattern, and points A' and B' are projected points of points A and B located on the micro-embossed pattern so as to give a predetermined length d between the points A' and B' with the projected point Q' serving as the middle point between the points A' and B.' The "minute regions s" each denote a region of the micro-embossed pattern between the points A and B, and the "angle θ)(°) of inclination" of the minute region s denotes the angle formed between the straight line passing through the points A and B and the reference plane P.

"All of the minute regions" refer to all of the minute regions s included in the micro-embossed pattern 3 per predetermined distance in the cross section K.

—Angle of Reflection of Light Applied to Micro-Embossed Pattern—

Figure 5:
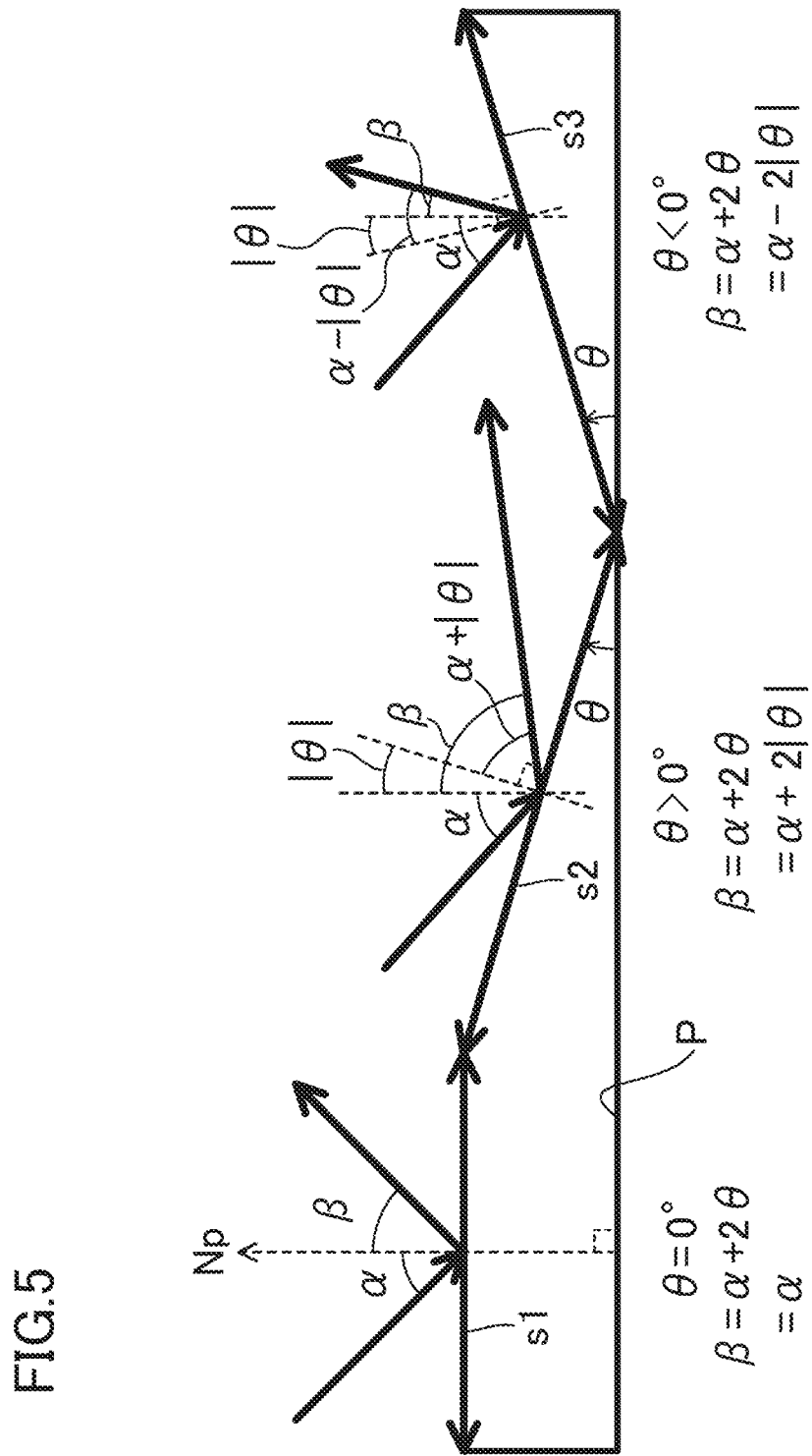
FIG. 5 illustrates a method for calculating an angle of reflection of reflected light.

FIG. 5 illustrates angles of reflected light (i.e., angles β of reflection) when light is incident on the micro-embossed pattern 3 at an angle α of incidence. As shown in FIG. 5, the angle α of incidence and the angle θ of reflection are given as the angles with respect to the normal vector Np of the reference plane P. The angle θ of reflection can be expressed as $\beta=\alpha+2\theta$, where θ represents the angle of inclination with respect to the reference plane P.

Specifically, for example, the angle θ of inclination of a minute region s1 with respect to the reference plane P is 0°. Thus, light incident at the angle α of incidence is specularly reflected at the angle β of reflection, where $\beta=\alpha+2\theta=\alpha$. In other words, for example, if the angle α of incidence is equal to 45°, the angle β of reflection is equal to 45°. The angle θ of inclination of a minute region s2 with respect to the reference plane P is greater than 0° (θ>0°). Thus, the angle β of reflection is expressed as $\beta=\alpha+2\theta=\alpha+2|\theta|$. The angle θ of inclination of a minute region s3 with respect to the reference plane P is less than 0° (θ<0°). Thus, the angle β of reflection is expressed as $\beta=\alpha+2\theta=\alpha-2|\theta|$.

Specularly reflected components of the reflected light contribute to the highlights, and allows the surface of the resin member 1 to be glossy. Thus, an increase in the percentage of the minute regions s with a small angle θ of inclination may increase the gloss of the surface of the resin member 1.

Specifically, the number of the minute regions s with the angle θ of inclination of from −10° to 10° ranges from 78% to 95%, preferably from 90% to 95%, of the number of all of the minute regions. The number of the minute regions s with the angle θ of inclination of from ~1° to 1° ranges from 25% to 40%, preferably from 30% to 40%, of the number of all of the minute regions. The proportion of the highlights in the reflected light can thus be increased, which can increase the gloss of the surface having the micro-embossed pattern 3. An increase in the proportion of the highlights can increase the contrast between the highlights and the shades. As a result, clearer shadows can appear. This can improve the design quality of the appearance of the resin member 1.

As can be seen from the minute regions s2 and s3 shown in FIG. 5, the angle β of reflection is greater or less than 45° at an inclined portion 34 that is configured as, for example, a transition portion of the micro-embossed pattern 3 from a recess 31 to a protrusion 32, 33. Thus, the reflected light is less likely to be specularly reflected, which leads to a reduction in the amount of light that contributes to the highlights.

The protrusions 32, 33 of the micro-embossed pattern in the resin member 1 according to this embodiment include the first protrusions 32, and the second protrusions 33 lower in height than the first protrusions 32. Setting the pitch D between the protrusions 32 and 33 to be in the range described above can reduce the proportion of the inclined portions 34 less contributing to the highlights. Thus, the amount of light corresponding to the highlights in the reflected light can be effectively increased. This can increase the gloss of the surface having the micro-embossed pattern 3 as described above, and can provide clear shadows, thus improving the design quality of the appearance of the resin member 1.

«Optical Properties of Resin Member»

A value of the lightness L* at a light receiving angle γ of 45° (γ=45°), i.e., the lightness L*45°, which indicates the amount of light specularly reflected off the resin member 1 and contributing to the highlights and obtained through the measurement test for optical properties, described below, ranges from 85 to 130, preferably from 110 to 130. The light receiving angle γ indicates the light receiving angle of a detector for use in the optical measurement test described below, and corresponds to the angle θ of reflection. The difference L*45°−L*20° between values of lightness L* at the light receiving angle γ of 45° (γ=45°) and the light receiving angle γ of 20° (γ=20°) which indicate the amount of reflected light in the vicinity of the specular reflection ranges from 47 to 96, preferably from 77 to 96. Furthermore, the difference $L^*_{55°}-L^*_{75°}$ between values of lightness L* at the light receiving angle γ of 55° (γ=55°) and the light receiving angle γ of 75° (γ=75°) which indicate the amount of reflected light in the vicinity of the specular reflection is less than 7.5, preferably less than 5. The average value $L^*_{-80°}$ to $L^*_{-55°}$ of values of the lightness L* of the reflected light at light receiving angles of −80°≤γ≤−55° which contributes to the darkness of the shades ranges from 20 to 80, preferably from 42 to 80. This makes it possible to obtain an adequate amount of reflected light corresponding to the highlights and enough darkness of the shades, which can ensure adequate gloss and clear shadows.

<Method for Manufacturing Resin Member>

The resin member 1 according to this embodiment is manufactured by injection molding using, for example, a forming mold 5 as shown in the upper part of FIG. 3.

Figure 6:
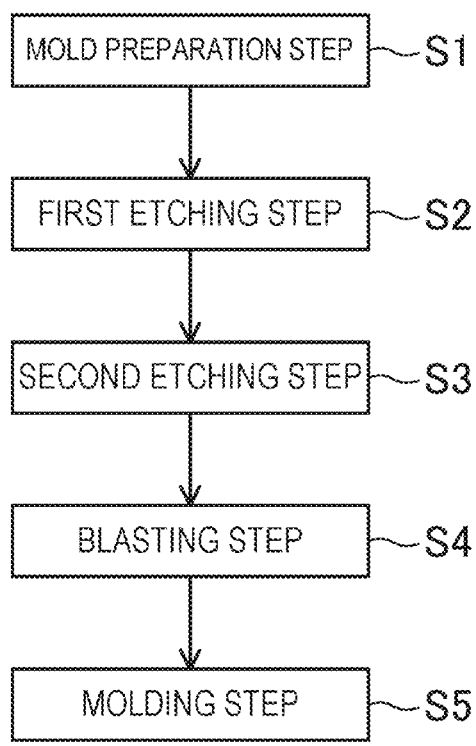
FIG. 6 is a flowchart for explaining a method for manufacturing a resin member according to an embodiment.

A method for manufacturing the resin member 1 includes a mold preparation step S1, a first etching step S2, a second etching step S3, an optional blasting step S4, and a molding step S5 as specifically shown in FIG. 6. These steps will now be described in detail.

«Mold Preparation Step S1»

The forming mold 5 includes a mold substrate 6 and a grained pattern 7 formed on the surface of the mold substrate 6. In the mold preparation step S1, the mold substrate 6 is prepared.

The mold substrate 6 of the forming mold 5 may be made of any metal material used for a mold for injection molding a typical resin material. Specific examples of the metal material include, for example, a steel material, a zinc alloy, and an aluminum alloy. Such a metal material is cut into the mold substrate 6 for forming an intended shape of the resin member 1.

«First Etching Step S2»

The grained pattern 7 is formed on the molding surface of the mold substrate 6 by the first etching step S2, the second etching step S3, and the blasting step S4 to form a micro-embossed pattern 3 on the resin member 1. The grained pattern 7 is the inverse of the micro-embossed pattern 3, and is transferred to the surface of the resin member 1 by the subsequent molding step S5.

The first etching step S2 is a step for forming a coarse grained pattern on the molding surface of the forming mold 5 as a preparation stage for forming the grained pattern 7. In the first etching step S2, the mold substrate 6 is washed with water or any other solution after treatment of the molding surface of the forming mold 5 with an etchant. As the etchant, for example, a chemical polishing solution for steel or a ferric chloride solution may be used alone or in combination with water, nitric acid, hydrochloric acid, or any other material. The components of the etchant, the proportions of the components, and the etching period are appropriately determined in accordance with the material of the mold substrate 6 to be etched, the intended height H and intended pitch D of the micro-embossed pattern 3, and other elements.

«Second Etching Step S3»

The second etching step S3 is a step for forming, through further etching, a finer-grained pattern in the molding surface on which the coarse grained pattern has been formed in the first etching step S2. The procedure of the second etching step S3 is similar to that of the first etching step S2: the mold is washed with water or any other solution after treatment of the molding surface with an etchant. The etchant may be similar to that used in the first etching step S2. The etchant may be an etchant identical to or different from that used in the first etching step S2. In the case of using the identical etchant, the etchant may include the components in the same proportions or in different proportions. Just like the first etching step S2, the components of the etchant, the proportions of the components, and the etching period are appropriately determined in accordance with the material of the mold substrate 6 to be etched, the intended height H and intended pitch D of the micro-embossed pattern 3, and other elements.

«Blasting Step S4»

The blasting step S4 is a step for forming the grained pattern 7 through blasting on the molding surface of the mold substrate 6 that has undergone the second etching step S3. The grained pattern 7 has protruding portions 71, and first and second recessed portions 72 and 73 with different heights, which when transferred to the surface of the resin member 1, form the recesses 31, and the first and second protrusions 32 and 33 of the micro-embossed pattern 3, respectively. Examples of the blasting include bead blasting and sand blasting. To obtain the grained pattern 7 that provides the intended micro-embossed pattern 3, bead blasting with glass beads having an average particle size D50 of about 50 μm to about 300 μm, for example, is preferable.

«Molding Step S5»

The forming mold 5 is placed in an injection molding apparatus having a stationary mold and a movable mold, and a resin material is injected into a cavity defined by the molding surface, and is molded. Typical injection molding conditions used in injection-molding a resin material may be applied as injection molding conditions, and may be appropriately changed in accordance with the resin material. After the resin material injected into the cavity has been solidified, the forming mold is released from the solidified resin material, thereby obtaining the resin member 1.

Second Embodiment

Now, other embodiments according to the present disclosure will be described in detail. In the description of these embodiments, the same reference characters as those in the first embodiment are used to represent the same elements, and the detailed explanation thereof will be omitted.

<Resin Member>

«Micro-embossed Pattern»

Figure 7:
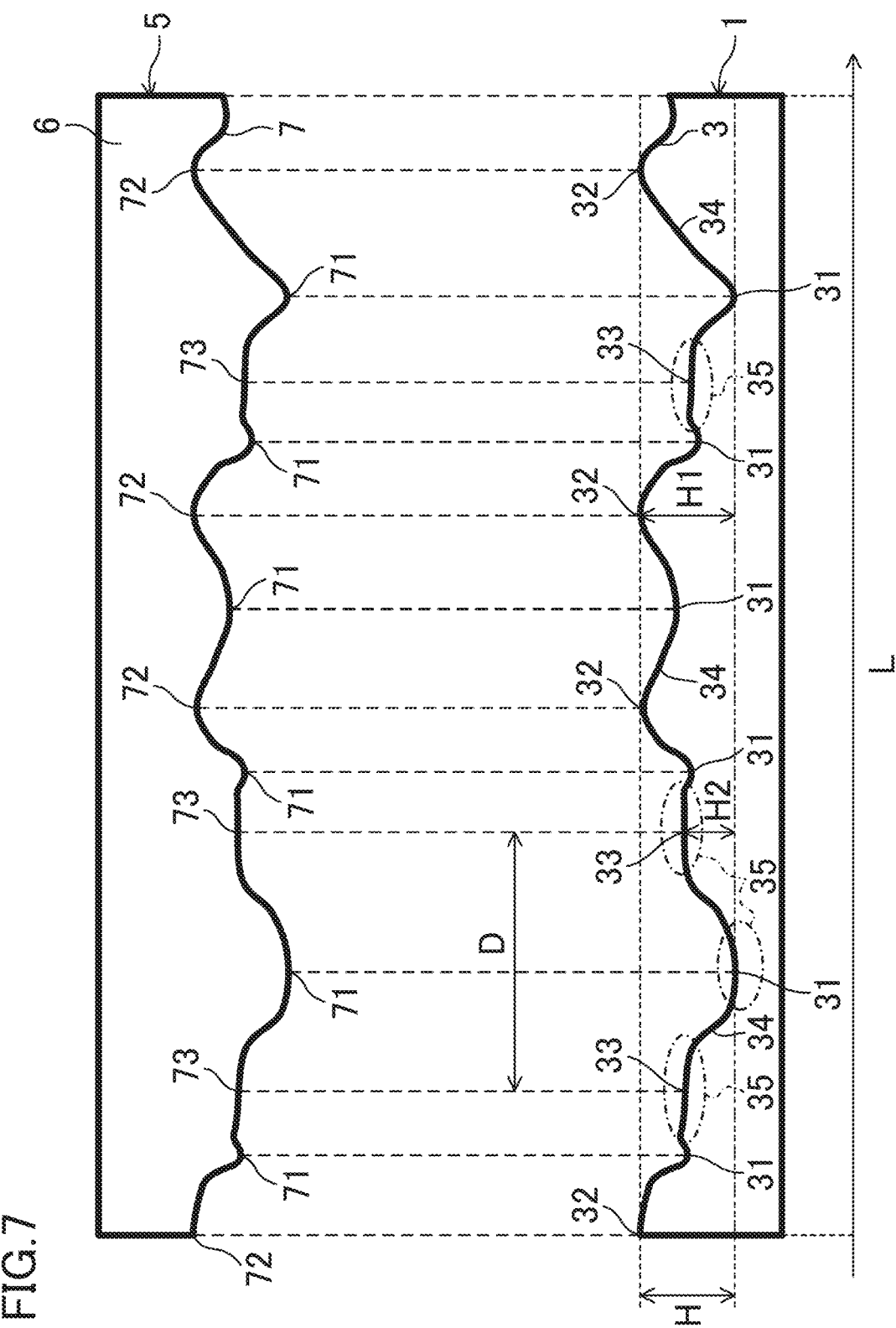
FIG. 7 illustrates a resin member according to an embodiment, and corresponds to FIG. 3.

FIG. 7 illustrates a micro-embossed pattern 3 of a resin member 1 according to a second embodiment, and corresponds to FIG. 3. From the surface shape observation test described below and analysis of the intensities of reflection, it is preferable that the micro-embossed pattern 3 in the cross section K perpendicular to the reference plane P includes, as illustrated in FIG. 7, five to eight flat portions 35 each having a length of 90 μm or more, preferably 90 μm or more and less than 300 μm, in a direction parallel to the reference plane P within a range of the length of 2500 μm. In other words, it is preferable that the micro-embossed pattern 3 has one flat portion 35 in average within a range of the length of from 300 μm to 500 μm.

Suppose that the visual spatial resolution at a distance of 30 cm from the retina of a human eye is about 90 μm. In that case, light incident on the flat portion 35 having a length of 90 μm or more may be specularly reflected. Thus, the reflected light can be clearly perceived by humans. The flat portions 35 provided at the above rate exhibit highly glossy portions to visual perception of humans at a certain rate. This can increase the graininess of the micro-embossed pattern, and can improve the design quality of the appearance of the resin member.

As shown in FIG. 7, each flat portion 35 may be configured as a portion of any one of the recesses 31 and the protrusions 32, 33.

If the flat portions 35 are configured as portions of the protrusions 32, 33, the pitch D can be calculated using the centers of the flat portions 35 instead of the peaks of the protrusions 32, 33, as can be seen from the cross section illustrated in the lower part of FIG. 7.

<Method for Manufacturing Resin Member>

Appropriately adjusting the etching conditions in the first and second etching steps S2 and S3 and the blasting conditions in the blasting step S4 allows the formation of the resin member 1 with a micro-embossed pattern 3 having the flat portions 35 within the range described above.

Third Embodiment

<Resin Member>

«Micro-embossed Pattern»

Figure 8:
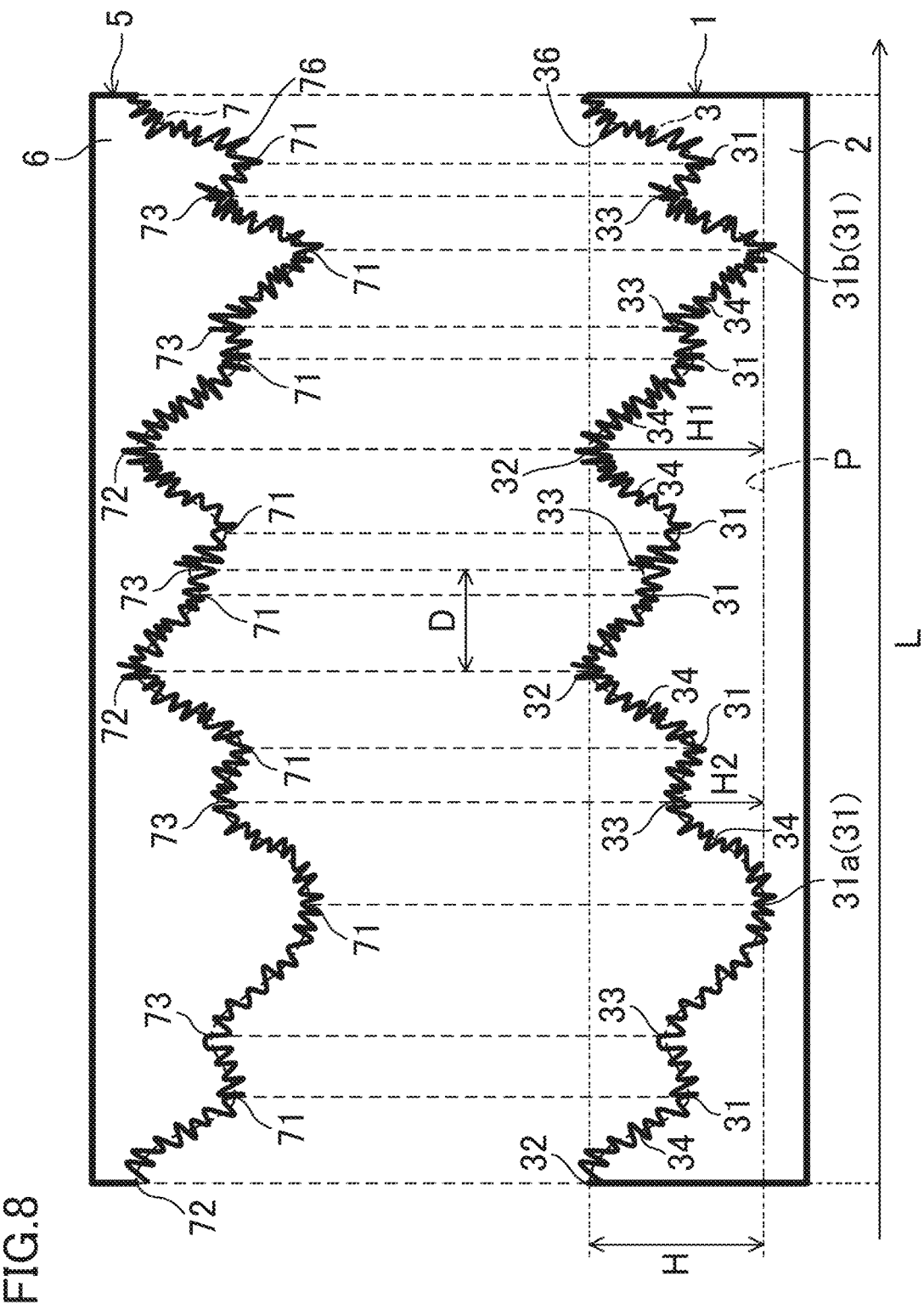
FIG. 8 illustrates a resin member according to an embodiment, and corresponds to FIG. 3.
Figure 9:
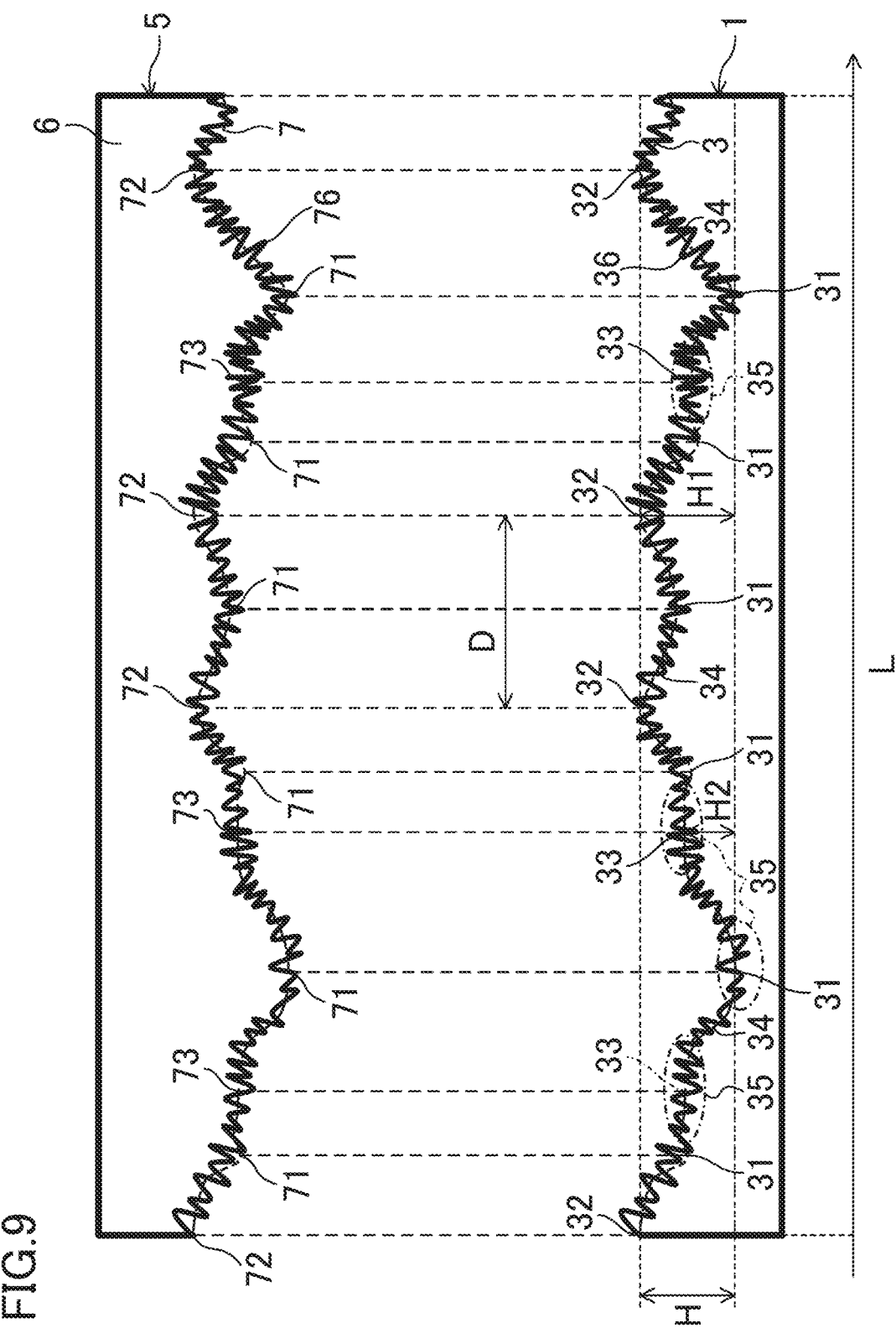
FIG. 9 illustrates a resin member according to an embodiment, and corresponds to FIG. 3.

As illustrated in FIGS. 8 and 9, finer asperities 36 than recesses 31 and protrusions 32, 33 may be formed in the surface of the micro-embossed pattern 3. In other words, the arithmetic average roughness Ra of the surface with the micro-embossed pattern 3 at a cut-off wavelength $\lambda s$ of 2.5 μm ($\lambda s=2.5$ μm) and a cut-off wavelength $\lambda c$ of 80 μm ($\lambda c=80$ μm) is obtained through the surface shape observation test for the protrusions 32, 33, described below, and the arithmetic average roughness Ra may range from 0.2 μm to 0.4 μm, preferably from 0.2 μm to 0.25 μm.

According to this configuration, setting the arithmetic average roughness Ra of the finer asperities 36 in the surface of the micro-embossed pattern 3 within the range described above can further increase the intensity of reflected light corresponding to the highlights. This can provide a resin member 1 having higher gloss, clearer shadows, and higher graininess and having an appearance with good design quality.

<Method for Manufacturing Resin Member>

Figure 10:
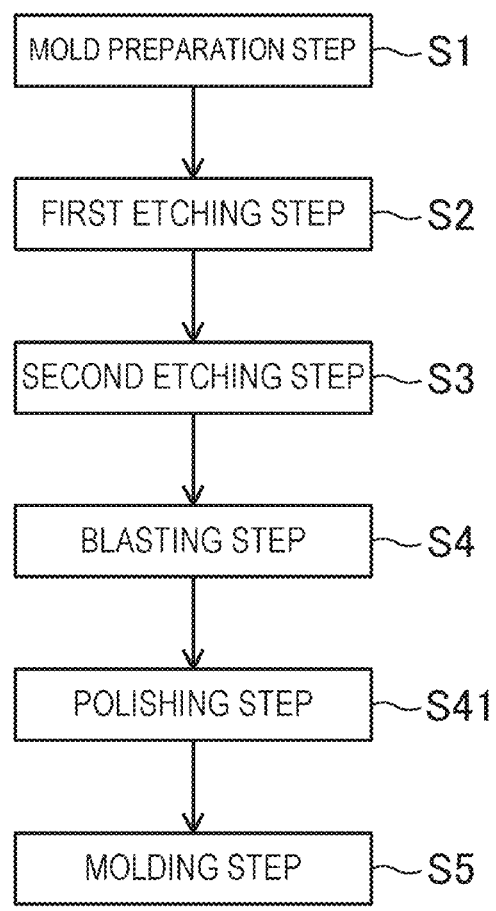
FIG. 10 is a flowchart for explaining a method for manufacturing a resin member according to an embodiment.

In addition to appropriately adjusting the etching conditions in the first and second etching steps S2 and S3 and the blasting conditions in the blasting step S4, providing the following polishing step S41 after the blasting step S4 as shown in FIG. 10 can effectively reduce the surface roughness of finer grains 76 of the grained pattern 7 which correspond to the finer asperities 36 that are finer than the micro-embossed pattern 3, thereby reducing the surface roughness of the finer asperities 36.

«Polishing Step S41»

Specifically, polishing a molding surface of a mold substrate 6 with the grained pattern 7 reduces asperities that are finer than the grained pattern. Specifically, the molding surface is polished with an abrasive, such as a buff cloth. This allows the finer asperities on the surface of the grained pattern to be polished away, smoothens the surface of the grained pattern, and reduces the surface roughness. A final forming mold is obtained in this manner. Note that this polishing step S41 is optional, and can be provided as necessary.

Other Embodiments

In the foregoing embodiments, the resin member 1 is manufactured by injection molding, but the method for manufacturing the resin member 1 is not limited to injection molding. Examples of the method include, for example, extrusion molding, vacuum molding, blow molding, injection compression molding, decorative molding, gas-assist injection molding, foam injection molding, low-pressure molding, ultra-thin injection molding (ultra-high-speed injection molding), and in-mold composite molding (insert molding, outsert molding), and a method of forming, for example, a precursor sheet comprised of laminated sheets of a resin material by press molding or any other technique. In one preferred embodiment, injection molding, injection compression molding, or a combination of these molding methods and in-mold composite molding are used in terms of production stability, cost efficiency, and other factors.

In a case of forming a micro-embossed pattern on a portion of the surface of the resin member 1, a corrosion-resistant coating, for example, is formed on a portion of the molding surface of the forming mold where a grained pattern is not to be formed.

EXAMPLES

Next, specific examples will be described.
(Resin Test Piece)

Example 1

«Manufacture of Mold»

Figure 11:
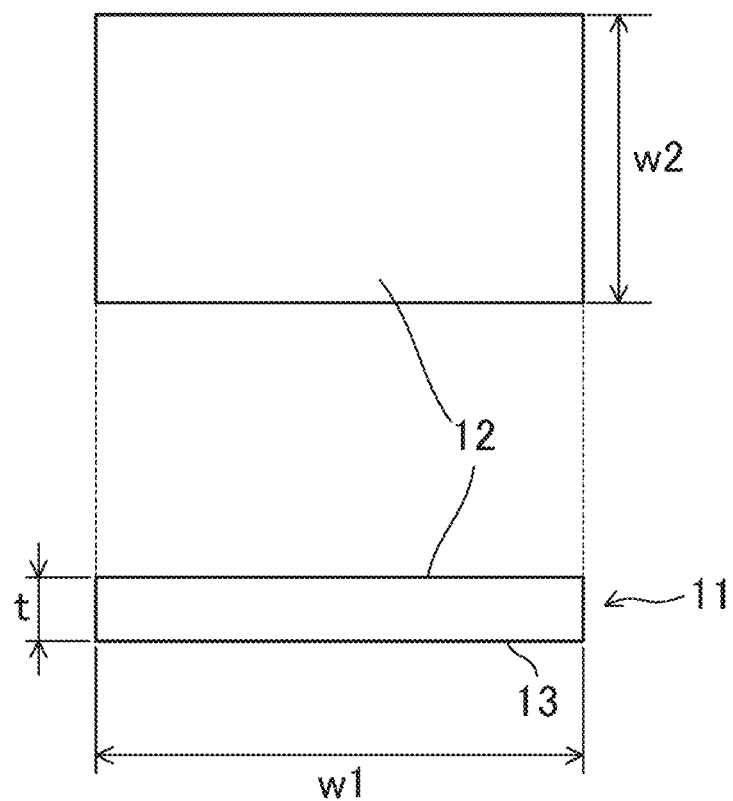
FIG. 11 illustrates schematic front and side views of a resin test piece according to Examples and Comparative Examples.

As illustrated in FIG. 11, a forming mold 5 was prepared to manufacture, by injection molding, a resin test piece 11 (300 mm in length (w1), 120 mm in width (w2), and 2.5 mm in thickness (t)) as a resin member 1. The reference character 12 denotes a surface of the resin test piece 11 on which a micro-embossed pattern 3 was formed. A back surface 13 of the resin test piece 11 had no micro-embossed pattern 3.

A commercially available steel material was cut into a mold substrate 6. Then, the molding surface of the mold substrate 6 was immersed in a mixed solution of water, nitric acid, and hydrochloric acid in the atmosphere at room temperature for 15 minutes to undergo a first etching process. Then, the mold substrate 6 was washed with water. Thereafter, the molding surface of the mold substrate 6 was further immersed in the mixed solution for 10 minutes to undergo a second etching process. Then, the mold substrate 6 was washed with water. Thereafter, the molding surface underwent bead blasting with glass beads having an average particle size D50 of about 100 μm. The forming mold 5 having the molding surface with a grained pattern 7 was obtained in this manner.

«Manufacture of Resin Test Piece»

A 180-ton injection molding apparatus (manufactured by FANUC CORPORATION) in which the forming mold 5 had been placed was used to mold, as a resin material, 98 parts by mass of polypropylene resin (BXZ04G manufactured by Japan Polypropylene Corporation) and 2 parts by mass of color masterbatch (F-30940MM BLACK manufactured by DIC Corporation), and obtain the resin test piece 11.

Example 2

A resin test piece was obtained using the same procedure as that of Example 1 except that the first etching process was performed for 30 minutes, and that the second etching process was performed for 20 minutes.

Example 3

A resin test piece was obtained using the same procedure as that of Example 2 except that the molding surface of a mold substrate that had undergone the second etching process was polished with a buff cloth for five minutes.

Example 4

A resin test piece was obtained using the same procedure as that of Example 2 except that a masterbatch PPCM917Y-95BLACK30X manufactured by Tokyo Printing Ink Mfg. Co., Ltd. was used as a color masterbatch, and that the molding surface of a mold substrate that had undergone the second etching process was polished with a buff cloth for five minutes.

Comparative Example 1

A resin test piece was obtained using the same procedure as that of Example 1 except that the first etching process was performed for 60 minutes, and that the second etching process was performed for 30 minutes.

Comparative Example 2

A resin test piece was obtained using the same procedure as that of Example 1 except that the first etching process was performed for 10 minutes, and that the second etching process was not performed.

Comparative Example 3

A resin test piece was obtained using the same procedure as that of Example 1 except that the first etching process was performed for 20 minutes, and that the second etching process was not performed.

(Various Measurements on Resin Test Piece)

Table 1 shows various test results of the resin test pieces of Examples 1 to 4 and Comparative Examples 1 to 3.

14 and 16 show exemplary histograms of Example 2 and Comparative Example 3, respectively.

As shown in Table 1, the percentage of the number of the minute regions s having the angle θ of inclination of from −10° to 10° and percentage of the number of the minute regions s having the angle θ of inclination of from −1° to 1°, to the number of the minute regions s per predetermined distance of 2500 μm (the number of all of the minute regions), were calculated.

TABLE 1

|  |  |  | Example | | | | Comparative Example | | |
| --- | --- | --- | --- | --- | --- | --- | --- | --- | --- |
|  |  |  | 1 | 2 | 3 | 4 | 1 | 2 | 3 |
| Shape | Difference in Elevation (μm) |  | 17.8 | 30.0 | 24.5 | 26.5 | 48.1 | 13.9 | 22.9 |
|  | Pitch Range (μm) |  |  |  | 100-500 |  |  | 300-500 |  |
|  | Percentage of Minute | −10° ≤ θ ≤ 10° | 92.3 | 83.8 | 93.2 | 91.4 | 76.1 | 88.7 | 77.6 |
|  | Regions (%) | −1° ≤ θ ≤ 1° | 34.4 | 28.1 | 30.8 | 31.8 | 22.9 | 22.5 | 19.2 |
|  | Flat Portions | Number (number/2500 μm) | 2.3 | 1.3 | 6.0 | 5.7 | 1.7 | 5.7 | 7.7 |
|  |  | Distance (μm/number) | 1087 | 1923 | 417 | 439 | 1471 | 439 | 325 |
|  | Arithmetic Average Roughness Ra (μm) |  | 0.34 | 0.36 | 0.22 | 0.21 | 0.39 | 0.33 | 0.39 |
| Optical Properties | Gloss | $L^*_{45°}$ | 101 | 85 | 110 | 109 | 74 | 91 | 83 |
|  |  | $L^*_{45°}-L^*_{20°}$ | 69 | 48 | 77 | 76 | 33 | 50 | 44 |
|  |  | $L^*_{55°}-L^*_{75°}$ | 46 | 20 | 42 | 42 | 1 | 19 | 4 |
|  | Shade Darkness | $L^*_{−80°}-L^*_{−55°}$ | 5.8 | 6.8 | 6.4 | 4.7 | 7.6 | 9.7 | 8.5 |
|  | Resin Substrate (Without Embossed Pattern) | $L^*_{−80°}$ | 5.6 | 5.6 | 5.6 | 3.9 | 5.6 | 5.6 | 5.6 |
| Visual Observation Results | Macrotexture | Gloss | A | B | A | A | D | B | D |
|  |  | Shade Darkness | B | B | B | A | D | D | D |
|  | Microtexture | Graininess | C | B | A | A | D | D | B |

<Surface Shape Observation Test>

Figure 12:
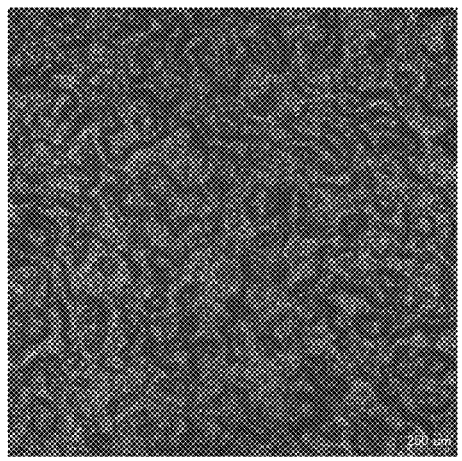
FIG. 12 shows an image obtained through measurement of the surface of a resin member according to an embodiment with a laser microscope.

A hybrid laser microscope (OPTELICS HYBRID L7-GA300 manufactured by Lasertec Corporation, scan resolution: 0.1 μm) was used to observe a micro-embossed pattern formed on the surface of each of the resin test pieces. FIG. 12 shows an image obtained by the observation of the surface of the resin test piece of Example 1.

Figure 13:
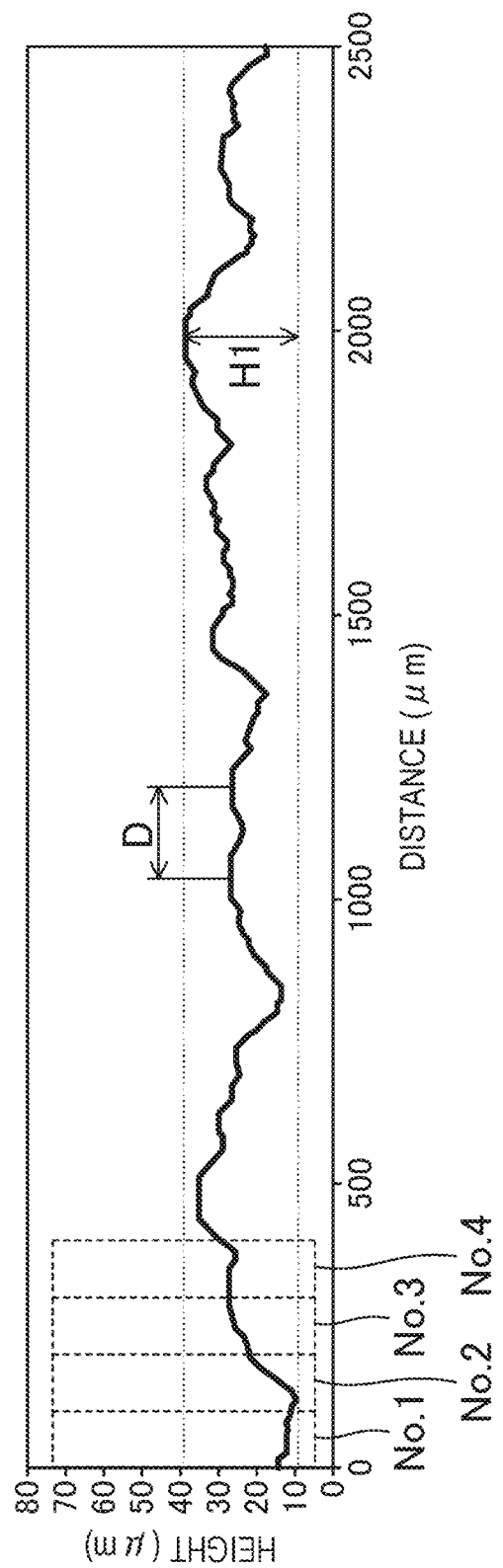
FIG. 13 is a surface shape profile obtained through measurement of the surface of a resin test piece according to Example 2 with a laser microscope.
Figure 14:
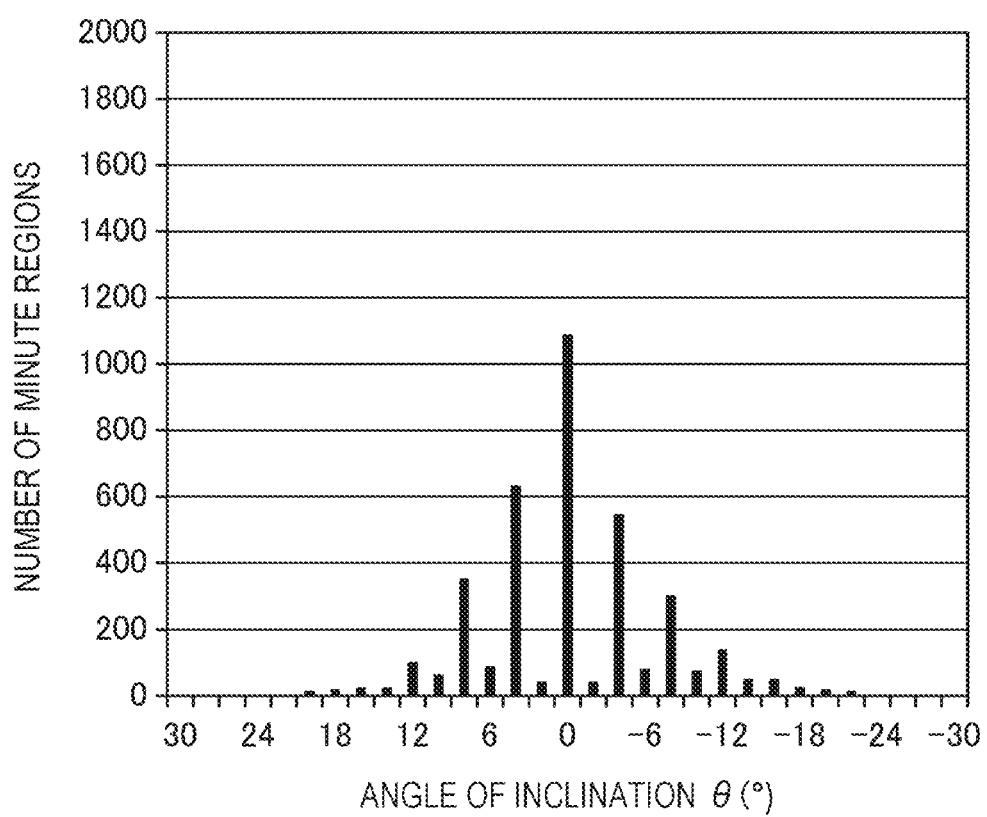
FIG. 14 is a histogram of the measurement results of FIG. 13 with respect to each of the angles of inclination of minute regions.
Figure 15:
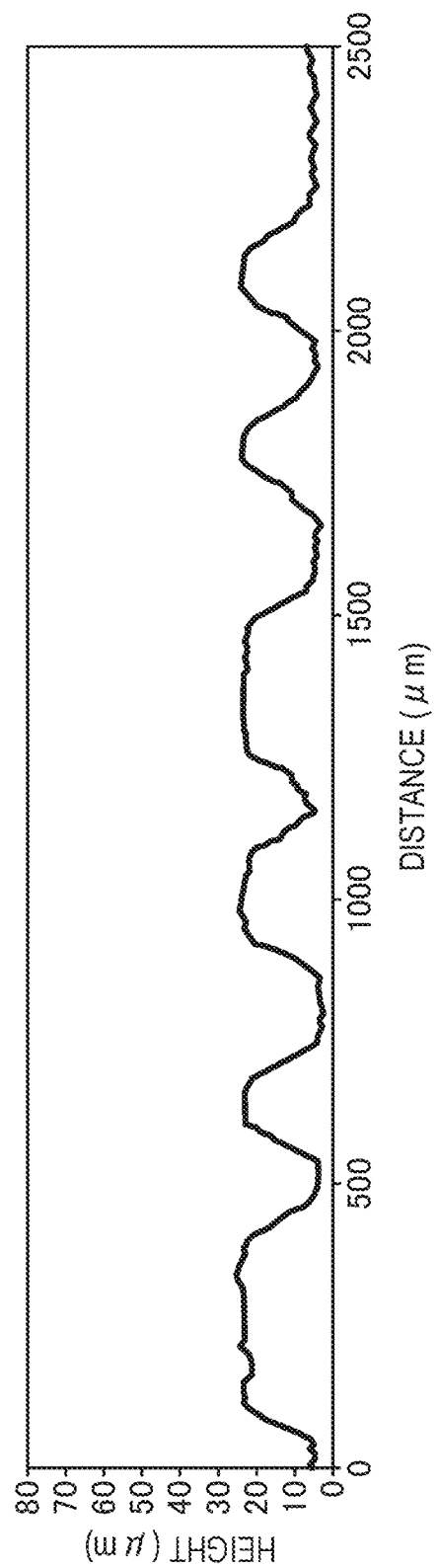
FIG. 15 relates to a resin test piece according to Comparative Example 3, and corresponds to FIG. 13.
Figure 16:
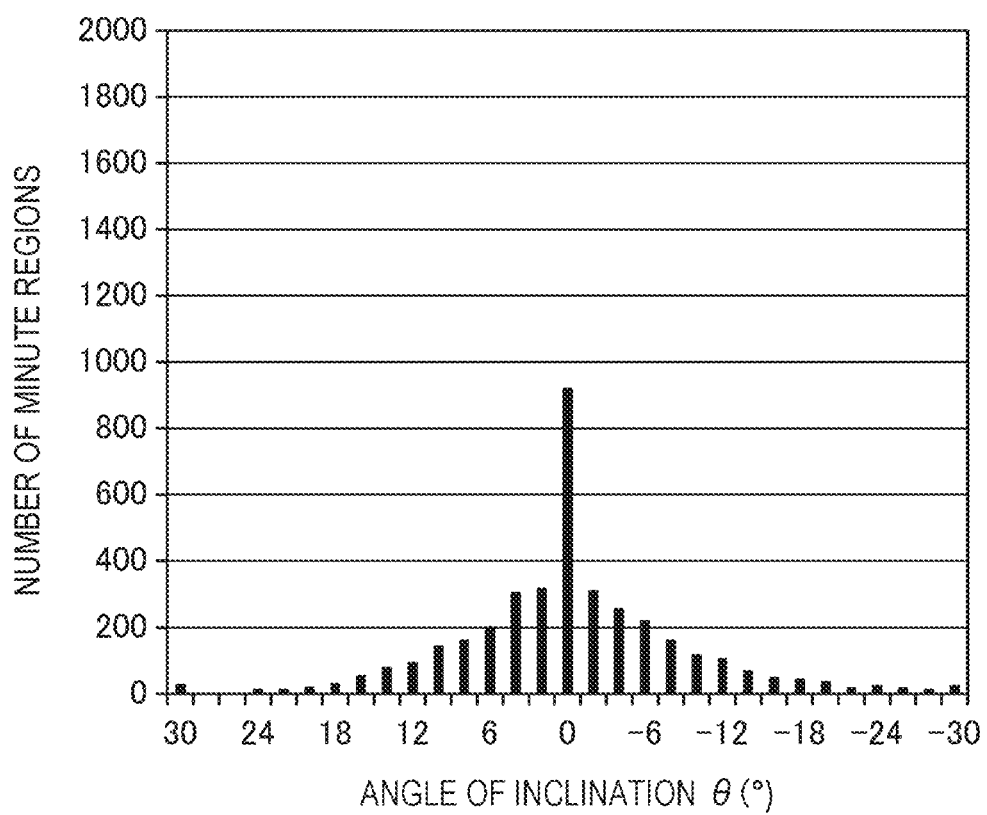
FIG. 16 is a histogram of the measurement results of FIG. 15 with respect to each of the angles of inclination of minute regions.

The surface shape profile of the micro-embossed pattern 3 in one optional cross section per visual field was obtained, and the average value of results in three visual fields was obtained as the measurement result. FIGS. 13 and 15 show examples of surface shape profiles of the micro-embossed patterns 3 of Example 2 and Comparative Example 3, respectively.

—Maximum Difference in Elevation, Pitch—

For example, as shown in FIG. 13, the maximum difference in elevation (μm) as the height H1 of the first protrusions 32 and the range (μm) of the pitches D between adjacent ones of the protrusions 32, 33 within a predetermined distance of 2500 μm were calculated from the surface shape profile of the micro-embossed pattern 3.

—Percentage of Minute Regions—

The angles θ of inclination of minute regions s were obtained from the surface shape profile of the micro-embossed pattern 3. The minute regions s were divided regions of the micro-embossed pattern 3 obtained by dividing the micro-embossed pattern 3 corresponding to a predetermined distance of 2500 μm by a predetermined length d of 0.7 μm. The number of the minute regions s per predetermined distance of 2500 μm was plotted with respect to each of the obtained angles θ of inclination to obtain a histogram. FIGS.

—Flat Portions—

First, the intensity $I_R$ of reflection of light incident on the micro-embossed pattern 3 at an angle of incidence of 45° in each of the minute regions s was calculated using the following formula (1).

$$I_R = (F(\alpha) \times n \times l)/I_0 \quad (1)$$

where α represents the above-described angle of incidence, F(α) represents the Fresnel reflectivity, n represents the number of the minute regions, l represents the length of the minute regions s, i.e., the length of the line segment AB in FIG. 4, for example, and $I_0$ represents the intensity of reflection from the resin substrate 2.

Figure 17:
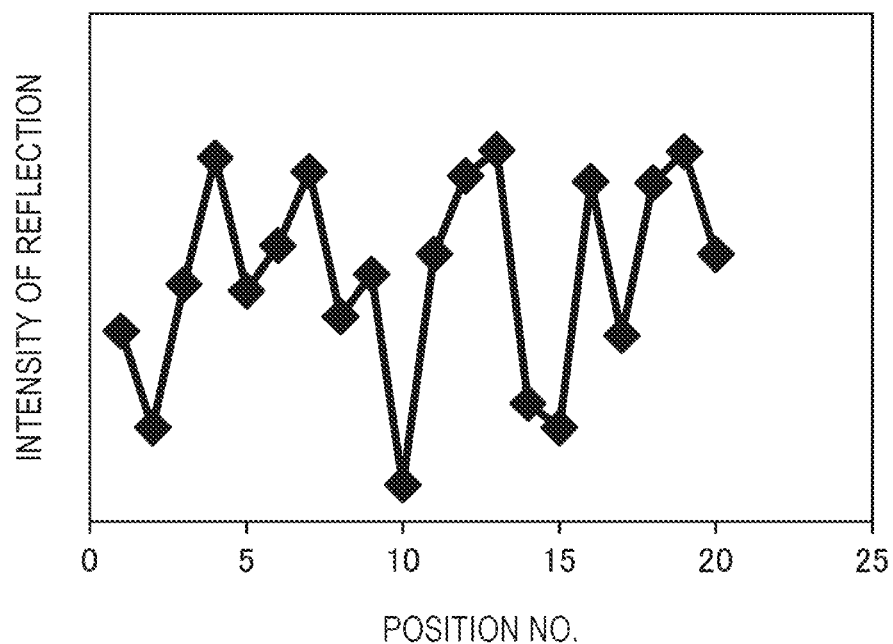
FIG. 17 is a graph showing the result of integrating the intensities of reflection from each of 90-μm-long portions of a cross-sectional profile obtained through measurement of the surface of a resin test piece according to Example 4 with a laser microscope.

As exemplified in position Nos. 1 to 4 of FIG. 13, the position numbers were assigned to regions having a length of 90 μm in sequential order from the start point of measurement. In each of the regions denoted by the position numbers, the intensities $I_R$ of reflection from the minute regions s were integrated. FIG. 17 shows exemplary results of integrating the intensities $I_R$ of reflection in Example 4. FIG. 17 shows that the integrated value of the intensities $I_R$ of reflection is greater in some of the regions, e.g., the region Nos. 4 and 7. The regions Nos. 4 and 7 may have flat portions with an angle θ of inclination of nearly equal to 0° and a length of about 90 μm or more. Likewise, for example, some of the numbered regions having maximal integrated values of the intensities $I_R$ of reflection in FIG. 17 were determined to be regions having the flat portions 35, and the number of such flat portions 35 present within the predetermined distance of 2500 μm was calculated so as to obtain the average number of the flat portions 35 in three visual fields, as described above. The average numbers of the flat portions (number/2500 μm) are shown in Table 1. Then, the predetermined distance of 2500 μm was divided by the calculated number of the flat portions 35 to obtain the distance per flat portion (μm/number).

—Arithmetic Average Roughness—

Furthermore, to analyze finer asperities on the micro-embossed pattern 3, the arithmetic average roughness Ra at the cut-off wavelength λs of 2.5 μm (λs=2.5 μm) and the cut-off wavelength λc of 80 μm (λc=80 μm) was measured. The cut-off wavelength λs is a set wavelength of a lowpass filter that removes components having shorter wavelengths than the set wavelength. The cut-off wavelength value λc is a set wavelength of a highpass filter that removes waviness components having higher wavelengths than the set wavelength.

<Measurement Test for Optical Properties>

Figure 18:
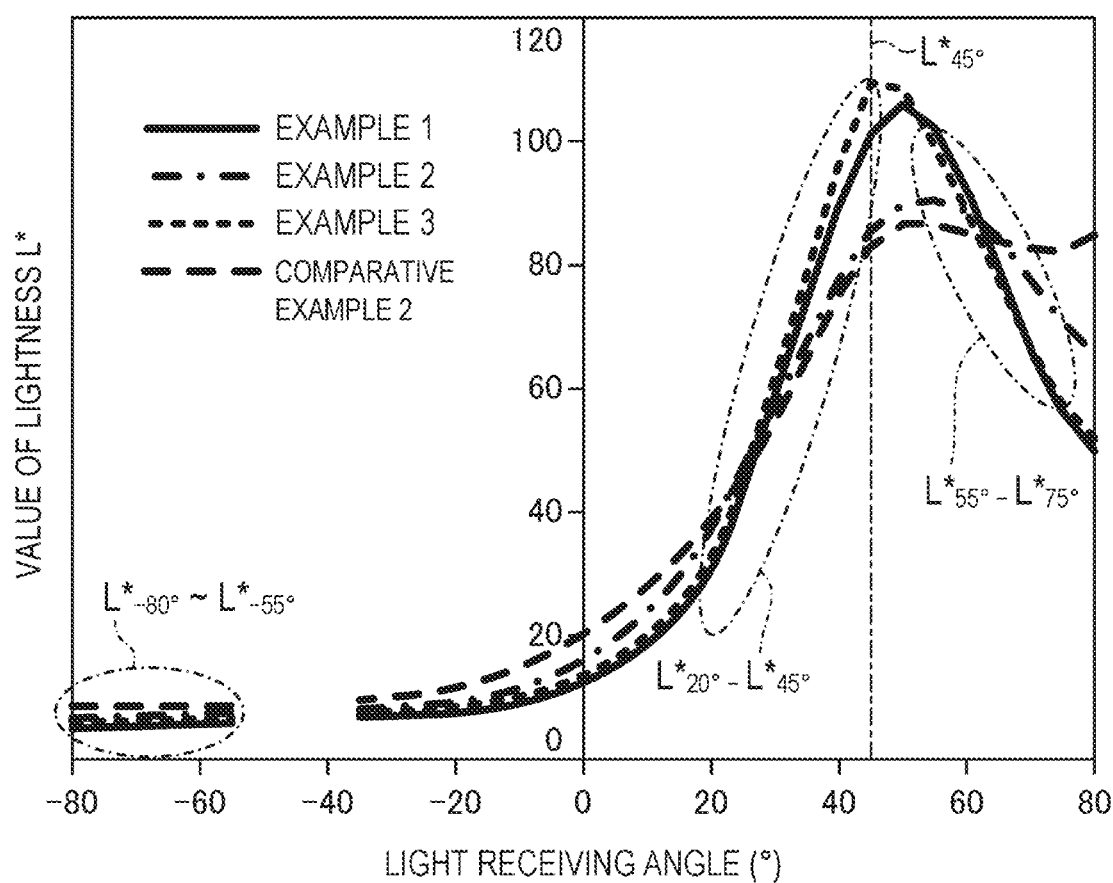
FIG. 18 is a graph showing the results of optical measurements on some of the Examples and Comparative Examples.

The value of L* was measured using a goniophotometer (a three-dimensional gonio-spectroscopic system GCMS-4 manufactured by Murakami Color Research Laboratory Co., Ltd.). Note that the angle α of incidence was 45°, and the light receiving angle γ, which is an angle of reflected light received by a detector, ranged from −80° to 80° (in units of 5°). The measurement results are shown in FIG. 18 and Table 1.

The value of lightness $L^*_{45°}$ at a light receiving angle γ of 45° (γ=45°) indicates the amount of specular reflection that contributes to highlights of reflected light. The difference $L^*_{45°}-L^*_{20°}$ between values of the lightness L* at the light receiving angle γ of 45° (γ=45°) and the light receiving angle γ of 20° (γ=20°) and the difference $L^*_{55°}-L^*_{75°}$ between values of the lightness L* at the light receiving angle γ of 55° (γ=55°) and the light receiving angle γ of 75° (γ=75°) both indicate the amount of reflected light in the vicinity of the specular reflection. The average value $L^*_{-80°}\sim L^*_{-55°}$ of values of the lightness L* of the reflected light at the light receiving angles of −80°≤γ≤−55° contributes to the darkness of the shades of the reflected light.

Compared with the test piece of Comparative Example 2, the test pieces of Examples 1 to 3 have highlights with higher lightness L* and shades with lower lightness L*.

The lightness $L^*_{-80°}$ of the resin substrate is a result obtained through a measurement test for optical properties on the resin test piece 11 which is shown in FIG. 11 and which has the surface 12 without the micro-embossed pattern 3.

<Visual Observation Test>

Three testers (two males, one female, 30 to 50 years old, with a corrected visual acuity of 0.5 or more in both eyes) observed the surfaces of the resin test pieces with their eyes 30 cm away from the surfaces. Evaluation items include three items, i.e., (1) gloss and (2) darkness of shades both as macrotexture, and (3) graininess as microtexture. The testers rated the evaluation items (1) to (3) on a five-point scale (5=very good; 4=good; 3=fair; 2=poor; 1=very poor). Based on the average of the evaluation results of all the testers, the observation results were obtained on the following scale: A=greater than 4 and less than or equal to 5; B=greater than 3 and less than or equal to 4; C=greater than 2 and less than or equal to 3; and D=less than or equal to 2.

As shown in Table 1, each of the resin test pieces of Comparative Examples 1 to 3 was rated as "D" in two or more of the evaluation items. In contrast, the resin test pieces of Examples 1 to 4 showed both good macrotexture and good microtexture in general, although the resin test piece of Example 1 has somewhat insufficient graininess.

INDUSTRIAL APPLICABILITY

The present disclosure can provide a resin member which has a surface with adequate gloss and adequate shadows and an appearance with superior design quality, a mold for molding the resin member, and a method for manufacturing the resin member. The present disclosure is therefore very useful.

DESCRIPTION OF REFERENCE CHARACTERS

1 Resin Member
2 Resin Substrate
3 Micro-embossed Pattern
31 Recess
32 First Protrusion
33 Second Protrusion
31a Lowest Point
36 Finer Asperities
5 Forming Mold
6 Mold Substrate
7 Grained Pattern
76 Finer Grains
C Motor Vehicle
D Pitch
H1 Height (of First Protrusion)
H2 Height (of Second Protrusion)
K Cross Section
P Reference Plane
S1 Mold Preparation Step
S2 First Etching Step
S3 Second Etching Step
S4 Blasting Step
S41 Polishing Step
S5 Molding Step
s Minute Region
θ Angle of Inclination
α Angle of Incidence
β Angle of Reflection
γ Light Receiving Angle

The invention claimed is:

1. A resin member comprising:
a resin substrate; and
a micro-embossed pattern formed on a surface of the resin substrate and having a plurality of recesses and a plurality of protrusions, wherein
a plane passing through three optional lowest points that are deepest points included in the micro-embossed pattern per unit area is used as a reference plane, and a shortest distance from the reference plane to an optional point on the micro-embossed pattern is regarded as a height of the micro-embossed pattern,
the plurality of protrusions includes:
a plurality of first protrusions having a height of from 15 μm to 35 μm; and
a plurality of second protrusions having a height of from ¼ to ¾ of the height of the first protrusions,
a distance between peaks of two adjacent ones of the plurality of protrusions ranges from 100 μm to 500 μm,
in a cross sectional view perpendicular to the reference plane, the micro-embossed pattern extends a predetermined distance in a direction parallel to the reference plane and is divided into minute regions each having a predetermined length between a first pair of points on the reference plane projected thereon from a corresponding second pair of points located on the micro-embossed pattern,
in the cross-sectional view perpendicular to the reference plane, the number of the minute regions having an angle of inclination formed between a straight line passing through the second pair of points and the reference plane of from −10° to 10° ranges from 78% to 95% of the number of all of the minute regions included in the micro- embossed pattern extending the predetermined distance, and the number of the minute regions having an angle of inclination of from −1° to 1° ranges from 25% to 40% of the number of all of the minute regions.

2. The resin member of claim 1, wherein in the cross sectional view perpendicular to the reference plane, the micro-embossed pattern has one flat portion disposed every 300 μm to 500 μm in the direction parallel to the reference plane, each flat portion having a length of 90 μm or more in the direction parallel to the reference plane.

3. The resin member of claim 2, wherein a set wavelength of a lowpass filter that removes components having shorter wavelengths than the set wavelength is a cut-off wavelength λs, a set wavelength of a highpass filter that removes components having higher wavelengths than the set wavelength is a cut-off wavelength λc, and an arithmetic average roughness Ra of the surface with the micro-embossed pattern at the cut-off wavelength λs of 2.5 μm and the cut-off wavelength λc of 80 μm ranges from 0.2 μm to 0.4 μm.

4. The resin member of claim 3, wherein a value of lightness of light incident at an angle of incidence of 45° and measured by a goniophotometer at a light receiving angle γ is represented as L*, a lightness L*45° at the light receiving angle γ of 45° ranges from 85 to 130, and a difference L*45°−L*20° between the lightness L*45° and a lightness L*20° at the light receiving angle γ of 20° ranges from 48 to 104.

5. The resin member of claim 4, wherein a value of lightness of light incident at an angle of incidence of 45° and measured by a goniophotometer at a light receiving angle γ is represented as L*, and a lightness L*−80° at the light receiving angle γ of −80° from a portion of the resin substrate where the micro-embossed pattern is not formed is less than 6.

6. A forming mold for manufacturing the resin member of claim 5.

7. A method for manufacturing a resin member, the method comprising:

manufacturing the resin member by injection molding using the forming mold of claim 6.

8. The resin member of claim 1, wherein a set wavelength of a lowpass filter that removes components having shorter wavelengths than the set wavelength is a cut-off wavelength λs, a set wavelength of a highpass filter that removes components having higher wavelengths than the set wavelength is a cut-off wavelength λc, and an arithmetic average roughness Ra of the surface with the micro-embossed pattern at the cut-off wavelength λs of 2.5 μm and the cut-off wavelength λc of 80 μm ranges from 0.2 μm to 0.4 μm.

9. The resin member of claim 1, wherein a value of lightness of light incident at an angle of incidence of 45° and measured by a goniophotometer at a light receiving angle γ is represented as L*, a lightness L*45° at the light receiving angle γ of 45° ranges from 85 to 130, and a difference L*45°−L*20° between the lightness L*45° and a lightness L*20° at the light receiving angle γ of 20° ranges from 48 to 104.

10. The resin member of claim 1, wherein a value of lightness of light incident at an angle of incidence of 45° and measured by a goniophotometer at a light receiving angle γ is represented as L*, and a lightness L*−80° at the light receiving angle γ of −80° from a portion of the resin substrate where the micro-embossed pattern is not formed is less than 6.

11. A forming mold for manufacturing the resin member of claim 1.

12. The resin member of claim 2, wherein a value of lightness of light incident at an angle of incidence of 45° and measured by a goniophotometer at a light receiving angle γ is represented as L*, a lightness L*45° at the light receiving angle γ of 45° ranges from 85 to 130, and a difference L*45°−L*20° between the lightness L*45° and a lightness L*20° at the light receiving angle γ of 20° ranges from 48 to 104.

13. The resin member of claim 2, wherein a value of lightness of light incident at an angle of incidence of 45° and measured by a goniophotometer at a light receiving angle γ is represented as L*, and a lightness L*−80° at the light receiving angle γ of −80° from a portion of the resin substrate where the micro-embossed pattern is not formed is less than 6.

14. A forming mold for manufacturing the resin member of claim 2.

15. The resin member of claim 8, wherein a value of lightness of light incident at an angle of incidence of 45° and measured by a goniophotometer at a light receiving angle γ is represented as L*, a lightness L*45° at the light receiving angle γ of 45° ranges from 85 to 130, and a difference L*45°−L*20° between the lightness L*45° and a lightness L*20° at the light receiving angle γ of 20° ranges from 48 to 104.

16. The resin member of claim 8, wherein a value of lightness of light incident at an angle of incidence of 45° and measured by a goniophotometer at a light receiving angle γ is represented as L*, and a lightness L*−80° at the light receiving angle γ of −80° from a portion of the resin substrate where the micro-embossed pattern is not formed is less than 6.

17. A forming mold for manufacturing the resin member of claim 8.

18. The resin member of claim 9, wherein a value of lightness of light incident at an angle of incidence of 45° and measured by a goniophotometer at a light receiving angle γ is represented as L*, and a lightness L*−80° at the light receiving angle γ of −80° from a portion of the resin substrate where the micro-embossed pattern is not formed is less than 6.

19. A forming mold for manufacturing the resin member of claim 9.

20. A forming mold for manufacturing the resin member of claim 10.

* * * * *